United States Patent [19]

Mitchell

[11] Patent Number: 5,377,936

[45] Date of Patent: Jan. 3, 1995

[54] NET KINETIC ENERGY DIFFERENTIAL GUIDANCE AND PROPULSION SYSTEM FOR SATELLITES AND SPACE VEHICLES

[76] Inventor: Maurice Mitchell, 601 Terra California, #4, Walnut Creek, Calif. 94595

[21] Appl. No.: 854,346

[22] Filed: Mar. 19, 1992

[51] Int. Cl.⁶ .................. B64G 1/24; B64G 1/34
[52] U.S. Cl. ................... 244/167; 244/164
[58] Field of Search ............ 244/158, 164, 166, 167, 244/168

[56] References Cited

U.S. PATENT DOCUMENTS

| | | | |
|---|---|---|---|
| 3,031,154 | 4/1962 | Roberson et al. | 244/167 |
| 3,162,396 | 12/1964 | Rongved et al. | 244/166 |
| 3,414,213 | 12/1968 | Eckermann | 244/168 |
| 3,480,232 | 11/1969 | Wyatt | 244/167 |
| 3,519,222 | 7/1970 | Altekruse et al. | 244/167 |
| 3,534,925 | 10/1970 | Gatlin | 244/166 |
| 3,567,155 | 3/1971 | Gatlin | 244/167 |
| 4,374,579 | 2/1983 | Renner | 244/164 |
| 4,426,052 | 1/1984 | Hubert et al. | 244/168 |
| 4,650,424 | 3/1987 | Mitchell | 434/211 |
| 4,728,061 | 3/1988 | Johnson et al. | 244/167 |
| 4,759,517 | 7/1988 | Clark | 244/168 |
| 4,776,540 | 10/1988 | Westerlund | 244/164 |
| 4,949,922 | 8/1990 | Rosen | 244/164 |
| 5,062,592 | 11/1991 | Kishimoto | 244/164 |
| 5,080,307 | 1/1992 | Smay et al. | 244/164 |
| 5,149,022 | 9/1992 | Flament | 244/164 |
| 5,183,225 | 2/1993 | Forward | 244/158 R |

FOREIGN PATENT DOCUMENTS 0136399  5/1990  Japan .................. 244/164

Primary Examiner—Michael S. Huppert
Assistant Examiner—Virna Lissi Ansley
Attorney, Agent, or Firm—Joseph J. Zito

[57] ABSTRACT

Apparatus and methods of Gravity Guidance and Propulsion of Geosynchronous Satellites, other satellites and space vehicles using net kinetic energy PUSH of Gravity of the electromagnetic spectrum particles which continually irradiate the earth from space, based on the Oppositely Charged Twin Monopole (OCTM) Theory of Matter. Specifically Fully Stabilized Geosynchronous Satellites can be made with the same lift-off weight as Spin Stabilized Geosynchronous Satellites by using GG&P Methods and Rules of mass distribution in the satellite.

3 Claims, 12 Drawing Sheets

NET KINETIC ENERGY DIFFERENTIAL GUIDANCE AND PROPULSION SYSTEM FOR SATELLITES AND SPACE VEHICLES

BACKGROUND OF INVENTION

The force known as gravity has been used to provide work, such as to power water wheels and hydroelectric dams, to act on weights as counter balances and in a wide variety of other apparatus.

The prior art has adopted the standard textbook concept of the force of gravity as an imaginary attractive force between two or more masses.

A highly ordered arrangement of matter has evolved from the chaotic arrangement of matter just after the Big Bang, over a long period of time. Many theories explain or attempt to explain how the known universe evolved from light and the other electromagnetic radiation and waves of particles from the various Big Bangs.

These great theories are like pieces of a puzzle. The big pieces go together easy. The hard part is getting the smaller pieces to fit perfectly with the edges of the big pieces. Many of the very small pieces seem to fit one place until more precise measurements are made. Then some of the theories do not fit actual experimental results.

For example, past theories of the force of gravity do not fit perfectly with some current experimental results; Charles et al, *New Theory of Gravity Has Scientists in a Tizzy*, San Francisco Chronicle, Dec. 19, 1990.

Past theories of light do not fit perfectly with some current experimental results; Marcia Bartusiak, *The Woman Who Spins the Stars*, Discover, October 1990, pages 88-94, an article about Dr. Vera Rubin, an astronomer who works at the Department of Terrestrial Magnetism in Washington. Dr. Rubin's experiments demonstrate the relative speed of the surface of stars emitting light in distant spiral galaxies, like the Milky Way, must be added to or subtracted from the emitted speed of light.

Past theories of crystals do not fit perfectly with some current experimental results; Arthur Fisher, *Getting Down to Atoms*, Popular Science, July 1983, a column about IBM's Scanning Tunneling Microscopy developed by scientists at the IBM Zurich laboratory in Switzerland.

Einstein's famous equation, $E=mc^2$, has been successfully applied to millions of experiments, but has not been successfully applied to the imaginary attractive force of gravity. An object of the present invention is to demonstrate that Einstein's equation can be applied to the balance-of-net-kinetic-energy force of gravity, as resulting from the effects of the electromagnetic spectrum of particles of matter from space.

Some experiments demonstrate that light is a particle, and other experiments demonstrate that light is a wave. Current theory accepts that light has simultaneously conflicting properties of both a wave and a particle. Newton's experiments on sunlight produced results demonstrating particles of light, as explained in his third book of Opticks.

The OCTM Theory of Matter, also known as the PUSH of Gravity Theory, enables scientists and students to understand why Newton refused to believe the attractive theory of gravity as he pointed out in his "Third Letter to Bentley (Feb. 25, 1692)" as follows: "It is inconceivable that inanimate, brute matter should, without the mediation of something else, which is not material, operate upon, and affect other matter without mutual contact, as it must be if gravitation, in the sense of Epicurus, be essential and inherent in it. And this is one reason why I desired you would not ascribe innate gravity to me. That gravity should be innate, inherent, and essential to matter, so that one body may act upon another at a distance through a vacuum, without the mediation of anything else, by and through which their action and force may be conveyed from one to another, is to me so great an absurdity that I believe no man who has in philosophical matters a competent faculty of thinking can ever fall into it."

Since Newton's equation for the kinetic energy of a mass of matter traveling at the speed of light is $E=mc^2$, the PUSH of Gravity Theory of Matter mathematically brings the net kinetic energy force of gravity into agreement with Einstein's basic equation.

SUMMARY OF THE INVENTION

Theory

The present invention is based on the Oppositely Charged Twin Monopole (OCTM) Theory of Matter. According to the OCTM Theory of Matter:
i) all mass is comprised of monopoles arranged in space lattice structures as taught in U.S. Pat. No. 4,650,424;
ii) electromagnetic radiation is comprised of discrete particulate matter, specifically helical coils of monopoles; and
iii) all forms of electromagnetic radiation, including visible
light, and radio frequencies, is comprised of these particles.

Gravity is a phenomenon resulting from the propagation of electromagnetic energy across the electromagnetic spectrum and is a measurable force resulting from the interaction of collisions between electromagnetic radiation particles with other particles or masses. Gravity is not a separate force comprised of gravitons, gravity waves or a postulated attractive force, as hypothesized. The force of gravity is the measured balance of net kinetic energy force of electromagnetic spectrum particles of matter, driving two or more masses into each other's mutual "matter shadows".

Under the OCTM theory, Gravity is unified with the electromagnetic, newtonian and nuclear forces because it exists as a result of the movement of particles propagated in the electromagnetic spectrum.

The OCTM Theory of Matter assumes the following are true:
(1) Einstein's equation, $E=mc^2$;
(2) Coulomb's law of charges;
(3) Newton's three laws of motion;
(4) the Big Bang theory and;
(5) The common thirteen non-parallel plane untwinned space crystal latticework as taught in U.S. Pat. No. 4,650,424, issued Mar. 17, 1987, entitled "Educational Device and Method", and incorporated herein by reference.

The OCTM Theory of Matter postulates that there is a smallest basic 'plus' particle of matter and a smallest basic 'minus' particle of matter, each being a monopole of influence and a twin of the other. All larger particles of matter are postulated to be comprised of these two basic particles.

Any defined volume of OCTM space is postulated to be either completely void of all matter or to contain one or more of the smallest basic particles of matter.

Initially, in deep OCTM space two basic monopoles, being of opposite or like charge, attract and/or repel each other according to Coulomb's law of charges. When two oppositely charged basic monopoles are close enough to each other and are traveling at low enough relative velocity so their fields of influence, according to Coulomb's law of charges, are strong enough to overcome their relative net vector linear momentums, according to Newton's three laws of motion, the two basic particles link forming the smallest postulated basic dipole of matter, FIG. 1.

When two oppositely charged monopoles of matter attract each other as above, they travel pursuit courses toward each other at an accelerating relative velocity. Occasionally, the initial net vector linear momentum of the two basic particles is such that the initial pursuit courses are on perfectly centered straight lines resulting in a perfect, direct, head-on collision. Such a perfect, direct, head-on collision results in an enormous release of kinetic energy, raising the temperature of the particles to the temperature range of some of the particles of matter in the corona of the Sun.

Most of the particles of matter, attracting each other as above, have initial relative net vector momentum paths that are not on perfect, direct, head-on collision paths. Their courses are paired curved pursuit courses, C, FIG. 1. By Newton's three laws of motion and Coulomb's law of charges, these paired pursuit courses effectively change most of the initial relative net vector linear momentum of the particles into angular momentum of rotation, R, of the particles of matter.

As long as this dipole of matter is not disturbed, it continues to rotate about it's initial axis according to Newton's laws of motion. When this dipole is viewed from the out, side, in the plane of rotation, the "plus" and "minus" hemispheres of charge are alternating so rapidly, the dipole of matter "seems" to have no charge when observed in current bubble chambers.

If the above dipole is rotating fast enough for Newton's laws of motion to overcome Coulomb's law of charges, it has a very short life, the dipole separates and the particles are ejected. Otherwise it becomes a stable arrangement of particles of matter. According to Newton's laws of motion, this initial angular momentum is still stored in some manner in most particles of matter.

Additional monopoles or other multiparticle combinations can collide with these dipoles to dislodge particles or to form larger groups of particles.

The smallest stable rotating tetrahedron of four particles is formed from two basic dipoles, FIG. 2.

The smallest stable rotating octahedron of six basic particles is formed either from three basic dipoles of matter, FIG. 3, or from four basic particles of matter of one charge and two basic particles of matter of opposite charge, FIG. 4.

The dipoles of matter form into tetrahedrons, FIG. 2, and octahedrons, FIGS. 3 and 4, or larger combinations FIG. 5, that arrange themselves into helical-like spirals, FIG. 6, when they are emitted from larger particles of matter.

In the OCTM Theory of Matter, these smallest arrangements of basic particles of matter continue to build into larger arrangements of basic particles, essentially maintaining the one "minus" particle for each "plus" particle with a few odd "plus" or "minus" particles in the outer layers of the particles of matter until a sufficiently large number of particles have combined to form the hydrogen atom and isotopes of hydrogen. As taught by the OCTM Theory of Matter, deep space is filled with hydrogen and isotopes of hydrogen. All elements can be formed from the particles of matter in hydrogen.

The combinations of particles of matter can be in the form of, (A) a crystal or solid, (B) a liquid, (C) a gas or, (D) very regular helical like spirals of particles of matter, FIG. 6. Radio waves and other electromagnetic spectrum waves, including light, are comprised of regular helical spirals, where simple and complex "twinning" of the common latticework occurs regularly.

Spirals of matter are emitted when Newton's laws of motion overcome Coulomb's law of charges. On Earth, probably the most common way spirals of matter are being emitted is the illumination of solids and liquids with light rays. When the emitted spirals of matter are of visible wave lengths, our eyes detect the spirals of matter, and we "see" the solids and liquids.

J. J. Gilman in his book *Art and Science of Growing Crystals* on page 47, FIG. 10, displayed pictures made by Brenner in 1957 of helical like spirals of copper crystal tetrahedrons and octahedrons condensed from copper halides. U.S. Pat. No. 4,650,424 describes how dipoles of matter go together forming these copper crystal spirals of tetrahedrons and octahedrons and the helical like spiral waves of particles of matter in light and the rest of the electromagnetic spectrum of particles.

The emitted spiral waves of particles of matter have a high degree of order. The orientation of the untwinned domains of octahedrons and tetrahedrons have a very regular arrangement around and along the centerline of the emitted ray.

In the OCTM Theory of Matter the speed of electromagnetic spectrum of particles of matter, including light, is a function of the escape velocity necessary for particles of matter, according to Newton's laws of motion, to overcome Coulomb's law of attraction. The relative speed of the emitting surface must be added to or subtracted from the escape velocity of the emitted spiral rays of matter. As predicted by the OCTM Theory of Matter, the famous Michelson-Morley experiment on the speed of light gives a null result in all directions. A different interpretation of the measurements of this famous experiment has caused unnecessary modification of some great theories of Newton and other scientists.

In the OCTM Theory of Matter, neutrinos, which seem to have no charge, are rapidly rotating particles of matter containing equal numbers of oppositely charged basic particles of matter (monopoles). The diameter of the "hard mass center" of the monopoles is very small in relation to the average distance between the "hard mass centers" of the twelve or so closest monopoles in the crust of the Earth. The average distance between "hard mass centers" of monopoles has been estimated to be as much as 30,000 to 90,000 the "hard mass center" diameter. The diameters of the "hard mass centers" of Neutrinos are so small, if only one was passing through the earth by itself at one time, the probability of it hitting another particle of matter in the earth has been estimated to be between one chance in $10^{10}$ and one chance in $10^{27}$. Therefore the "hard mass center" area of most matter in the Earth is very low.

However, by some estimates there are about 102 neutrinos coming in from space each second for each square centimeter of the area of the atmosphere of the Earth. In the OCTM Theory of Matter, the increase in atmospheric pressure as one approaches sea level is the direct result of the net balance of the kinetic energy force of particles from space, acting on the particles of matter in the atmosphere. The increase in temperature as one goes down into the Earth is the direct result of the net balance of the kinetic energy force of particles of matter from space, acting on the particles of matter in the Earth. As one goes down into the Earth, the rate of temperature increase is about the same until around 12,000 meters. At about 12,000 meters, the rate of temperature increase begins to increase at a faster rate than before. The "cascade effect" of particle collisions begins to be evident.

The "cascade effect" is where one particle of matter, traveling at about the speed of light, hits a particle of matter in the Earth and then two or more particles of matter travel from the collision in different directions. These particles of matter on average, are traveling at less than half the speed of light, and are much more likely to hit other particles of matter in the Earth. When these particles of matter traveling at less than half speed, hit other particles of matter, there are more than four particles of matter traveling at less than one fourth speed going in many random directions. When these particles of matter traveling at less than one fourth speed hit other particles of matter, there are more than eight particles of matter traveling on average less than one eighth speed going in even more random directions.

Soon this "cascade effect" transfers much of the original kinetic energy force of the particles of matter from space into heat in the Earth.

A small amount of the total original net kinetic energy force accelerates the Earth-Moon system into the "matter shadow" of the Sun, or into their mutual "matter shadows".

In the OCTM Theory of Matter the force of gravity is the net balance of kinetic energy force of all of the particles of matter from space, driving two or more pieces of matter into each other's mutual "matter shadows". The net imbalance of the electromagnetic radiation on the particles of two facing objects drives the objects toward each other.

Scientists know (1) the Moon is locked in orbit with it's more massive side pointed away from the Earth, (2) the Moon is slowly moving away from the center of the Earth, (3) the rotation of the Earth about it's North-South axis is slowing down, and (4) the actual "tide action" continues to change in ways not fully understood requiring that the "Tide Tables" be continually updated. The traditional PULL of Gravity Theory does not have completely acceptable answers to why these four measured actions occur. A "dumbbell" and "Tidal Force" theory are postulated but many scientists agree the theories are not convincing.

The OCTM Theory of Matter predicts these four natural events as follows:

(1) The massive end of an object in orbit automatically attempts to point into the incoming particles from space and the object locks in orbit, if the balance of net kinetic energy force is enough to overcome the inertia of the object in orbit the object will rotate about it's center of mass each orbit.

(2) The action of both Lunar and Solar eclipses PUSH the Earth and Moon apart.

(3) The mass of the particles from space that are absorbed by the Earth, increases the combined mass of the Earth and by Newton's laws of motion, this slows the rotation of the Earth down.

(4) Water of lakes, seas and oceans, upswell into the center of the "Matter shadows", M, FIG. 17, of the Earth and the Sun as they slowly move across the bodies of water. The areas opposite the "Matter shadows" receive the full flux of incoming particles from space. The traditional PULL of Gravity mechanics and mathematics give different answers for the "Tidal force".

The OCTM Theory of Matter gives Newton's Universal Equation of Gravity, adjusted for traveling at the speed of light as follows:

Taking a first right circular cone with it's apex at the center of the Moon and it's base at the limb of the Earth, as shown in FIG. 15. This cone outlines a circular "net kinetic energy Earth matter shadow" on the surface of the Moon, E in FIG. 16. Mathematically, this represents the net area of the Moon that Earth matter is effectively shielding from particles of matter from space. The matter of the Earth is absorbing this net kinetic energy force instead of the Moon, +E, FIG. 17. All other surface areas of the Moon, except the area opposite the "net kinetic energy Sun matter shadow" have an opposite surface area absorbing roughly equal amounts of kinetic energy force from particles of matter from space. Therefore, the net kinetic energy balance of force of this first cone, +M, FIG. 17, is accelerating the Moon toward the Earth.

Taking a second right circular cone with it's apex at the center of the Earth and it's base at the limb of the Moon as shown in FIG. 16. This cone outlines a circular "net kinetic energy Moon matter shadow" on the surface of the Earth, M, FIG. 16. Mathematically, this represents the net area of the Earth that Moon matter is effectively shielding from particles of matter from space. The matter of the Moon is absorbing this net kinetic energy force instead of the Earth, +M, FIG. 17.. All other surface areas of the Earth, except the area opposite the "net kinetic energy Sun matter shadow", have an opposite surface area absorbing roughly equal amounts of kinetic energy force from particles of matter from space. Therefore the net kinetic energy balance of force of this first cone, +E, FIG. 17, is accelerating the Earth toward the Moon.

The areas of the two "matter shadows", M and E, in FIG. 17, described above, between two orbiting spheres, are always exactly equal to each other, independent of the relative size of the spheres.

The force of gravity causes moons to orbit their planets and planets to orbit the Sun at radii that are the 3/2th power of their distances from their mutual centers.

At any given point in orbit, the equal areas of the two circular Moon-Earth "matter shadows" are a function of the square of the radius of the Moon or Earth and the distance between the centers of the Moon and Earth. At the same point, the masses of the Earth and Moon are a function of the cube of their radii. The radii of the Moon and Earth can be expressed as a function of the distance between their mutual centers. Mathematically the equation for the net balance of kinetic energy force of gravity can be expressed as a function of the masses being accelerated toward each other, divided by the area of their mutual "matter shadows". In other words, the force of gravity can be expressed as a function of the cubes of the radii of the Moon and Earth (masses), divided by a function of the square of the radius of either the Moon or Earth (area of mutual "matter shadows"). This net balance of kinetic energy force of gravity travels at the speed of the incoming particles of matter from space, (speed of light). The radius of the mutual "matter shadows" can be expressed as a function of the square of the distance between their mutual centers. Therefore the OCTM Theory of Matter predicts the force of gravity travels at the speed of light, and can be expressed "as the 3/2th power of the distances" between the centers of the Earth and the Moon.

The masses of the Moon and Earth are essentially constant during orbit. The net kinetic energy force of matter from space, per square centimeter, hitting the areas opposite their mutual "matter shadows" is essentially constant during orbit. The areas opposite their mutual "matter shadows" change just like their mutual "matter shadows" change, depending on the point in orbit and the distance between their mutual centers. At any point in orbit, the Earth and Moon automatically move into a dynamic net kinetic energy force balance, where the areas receiving net kinetic energy force are just the right size to provide the necessary net kinetic energy force to accelerate the Moon mass and Earth mass toward each other to maintain their mutual orbits.

The tangential speeds of the Moon and Earth in their orbits are not substantially changed due to the action of the net balance of kinetic energy force acting on their mutual "matter shadows". When the distance between their mutual centers increases as it does during orbit, the net balance of kinetic energy force decreases. When the distance between their mutual centers decreases as it does in orbit, the net balance of kinetic energy force increases. The greater distance between their mutual centers increases the time the net balance of kinetic energy force acts during a given arc of orbit. The smaller distance between their mutual centers deceases the time the net balance of kinetic energy force acts during a given arc of orbit. The Earth-Moon orbit is a delicate balancing act of the area the net kinetic energy force is acting on and the time this net kinetic energy force is acting during a given arc of the orbit.

Mathematically, according to the OCTM Theory of Matter, two spherical masses of matter orbiting each other, are accelerated toward each other with a net kinetic energy force of gravity proportional to their masses and inversely proportional to the square of the distance between them, where the net kinetic energy force of gravity travels at the speed of particles of matter from space, (speed of light).

The far side of the Moon points away from the center of the Earth. Based on certain measurements over the past two hundred years, most Scientists agree the center of the Moon has, on balance, moved away from the center of the Earth.

Mathematically, except during eclipses, the traditional attractive force of gravity theory and the balance of net kinetic energy force of gravity of the OCTM Theory of Matter give almost the same results. Without eclipses, both predict the Moon will move closer to the Earth over a long period of time, just as a satellite's orbit slowly decays and falls into the atmosphere. However, when eclipses are factored in, the OCTM theory predicts that on balance the masses of the Moon will move away from the Earth, as has been demonstrated through experimental observation.

The net kinetic energy force of gravity of the OCTM Theory of Matter explains mathematically how the Moon's most massive side can remain locked in orbit essentially pointing away from the center of the Earth, and how the Moon can very, very slowly move away from the Earth, when eclipses are involved.

When a Solar eclipse occurs, the normal "net kinetic energy Sun matter shadow" on the Earth is partially blocked by the "net kinetic energy Moon matter shadow" on the Earth. When this occurs, more total net kinetic energy force from space is pushing on the Earth from the direction of the Sun and Moon. As long as this Solar eclipse continues, this additional net kinetic energy force pushes the Earth away from the Sun and Moon more than would have been the case if the Solar eclipse had not occurred.

When a Lunar eclipse occurs, the normal "net kinetic energy Sun matter shadow" on the Moon is partially blocked by the "net kinetic energy Earth matter shadow" on the Moon. When this occurs, more total net kinetic energy force from space is pushing on the Moon from the direction of the Sun and Earth. As long as this Lunar eclipse continues, this additional net kinetic energy force pushes the Moon away from the Sun and Earth more than would have been the case if the Lunar eclipse had not occurred.

During both Solar and Lunar eclipses the distance between the Earth and the Moon is being increased by a slight amount. As predicted by the OCTM Theory of Matter, by actual measurements over the past 200 hundred years, the center of the Moon has slowly moved away from the center of the Earth.

The Moon is currently locked in orbit with it's "far side" always essentially pointing away from Earth. As predicted by the OCTM Theory of Matter, the Moon is locked in orbit with it's more massive side essentially pointing away from the center of the Earth.

The Earth rate of rotation about it's North-South axis is very slowly decreasing. As predicted by the OCTM Theory of Matter, the Earth is absorbing some of the particles from space and gradually increasing it's total combined Mass. By Newton's laws of motion, the Earth's rate of rotation must slow down when it's mass is increased by the absorption of the particles of matter from space in the balanced net kinetic energy force of the PUSH of Gravity.

The OCTM Theory of Matter brings the force of gravity into agreement with Einstein's famous equation, $E=mc^2$. The OCTM Theory of Matter is in agreement with the experimental results of presently known experiments on solids, liquids, gases, light and the other electromagnetic spectrum particles of matter. The simplicity of the OCTM Theory of Matter is elegant.

Exemplary Embodiment

The object of the subject invention is to use the net balance of kinetic energy PUSH of Gravity force, according to the OCTM Theory of Matter, to help guide satellites and space vehicles. The exemplary embodiment to be described first relates to geosynchronous communication satellites, however the method of guidance taught in the invention applies to guidance of any satellite in orbit about a heavenly body.

As a first exemplary embodiment of the OCTM Gravity Guidance and Propulsion (GG&P) invention, the invention is taught as applied to an Artificial Earth Satellite, specifically a Geosynchronous Earth Communications Satellite that has been placed in proper orbit by conventional means.

According to the Institute for Defense Analysis, a fully stabilized Geosynchronous Earth Communications Satellite at 22,300 miles can be about 25 times more effective than a Spin Stabilized Geosynchronous Earth Communications Satellite like the Telstar satellites at the same altitude. This is because all of the pencil beam microwave antennae can be pointed toward the center of the earth all of the time, instead of pointing in a full 360 degree fan for the Spin Stabilized Telstar. Present known Fully Stabilized Guidance Systems for Geosynchronous Earth Communications Satellites require too much rocket power to maintain the pencil microwave beams pointing to the center of the Earth to take advantage of this 2,500 percent increase in communications ability.

According to the OCTM Theory of Matter, the net kinetic energy PUSH of gravity is ideal for guiding a Geosynchronous Earth Satellite in a Fully Stabilized orbit. By implementing Level I, II or III Methods of the new GG&P invention separately or in combination with other Methods taught by the invention, present Spin Stabilized Geosynchronous Communications Satellite manufacturers can have a Fully Stabilized Geosynchronous Communications Satellite with 2,500 percent more capacity without increasing the lift-off weight of their satellites. The satellite present key communications elements and present geosynchronous guidance equipment must be repackaged and re-progrmmed according to Level I Method Rules of the new GG&P invention.

The Level I, Level II and Level III Method Rules of the invention for Communications Satellites can be used in conjunction with or without the Gravity Particle Sail Method, the Gravity Particle Wedge Surfaces Method and the Momentum Wheel Orientation Method of the GG&P invention.

DETAILED DESCRIPTION OF A PREFERRED EXEMPLARY EMBODIMENT OF THE INVENTION

The Level I, Level II and Level III Methods of guidance for the GG&P invention for Communications Satellites are as follows:

Level I Method—Maintains the satellite in the Fully Stabilized attitude in orbit so the antennae end is always essentially pointing to the center of the Earth. Present techniques are used to place the satellite in proper Geosynchronous Orbit and for station keeping.

Level II Method—Performs Level I Method guidance and keeps the satellite on station after the satellite is in proper Geosynchronous Orbit. Present techniques are used to place the satellite in proper Geosynchronous Orbit.

Level III Method—Performs Level II Method guidance and changes the normal Geosynchronous Altitude from about 22,300 miles to a predetermined GG&P Geosynchronous Altitude that is slightly higher or slightly lower than the normal 22,300 miles. Present techniques are used to place the satellite in proper orbit at the desired GG&P Geosynchronous Altitude.

Figure 1:
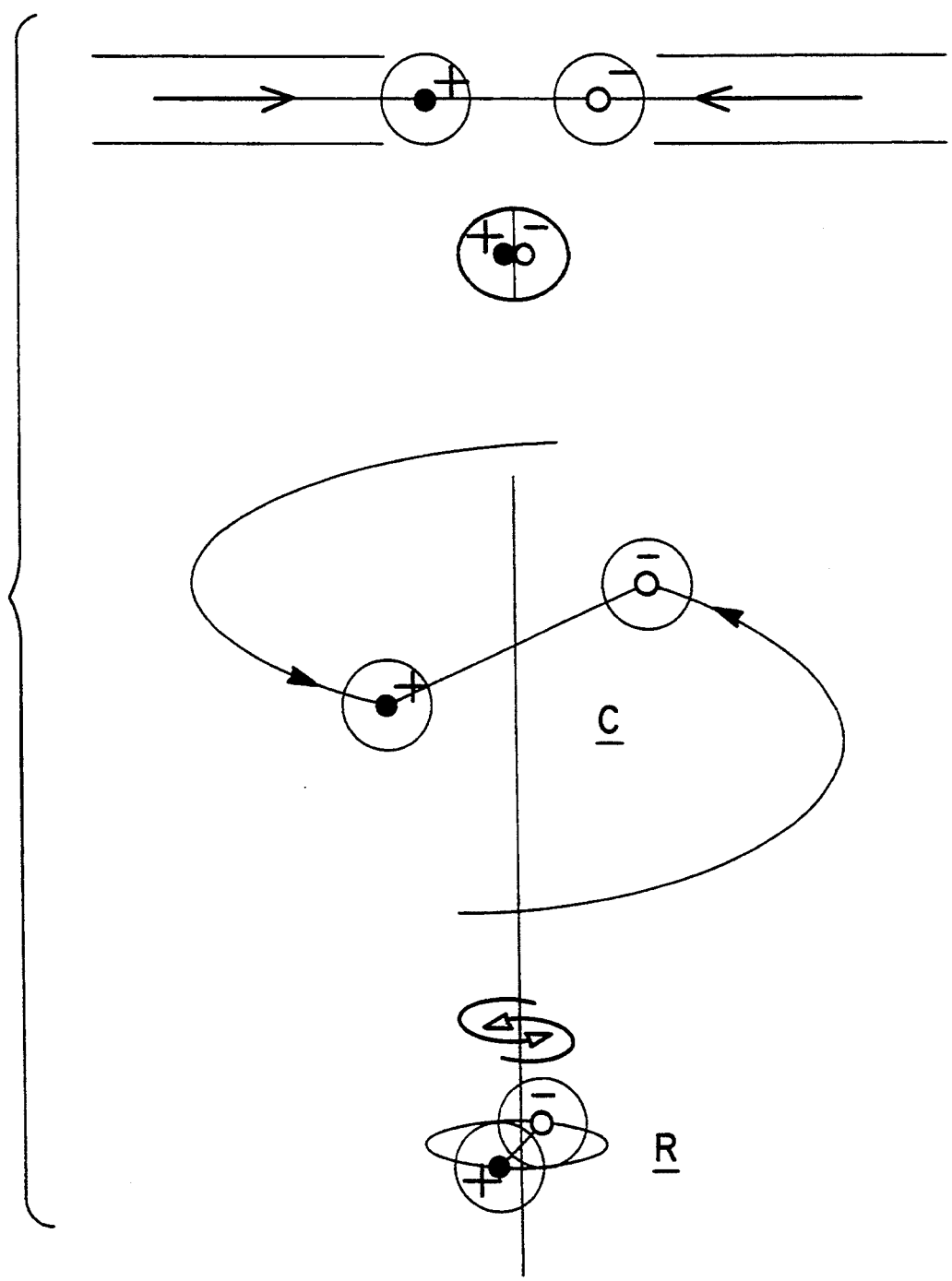
FIG. 1 is a diagrammatic view illustrating the formation of a dipole from an interactive collision of two opposite monopoles.
Figure 3:
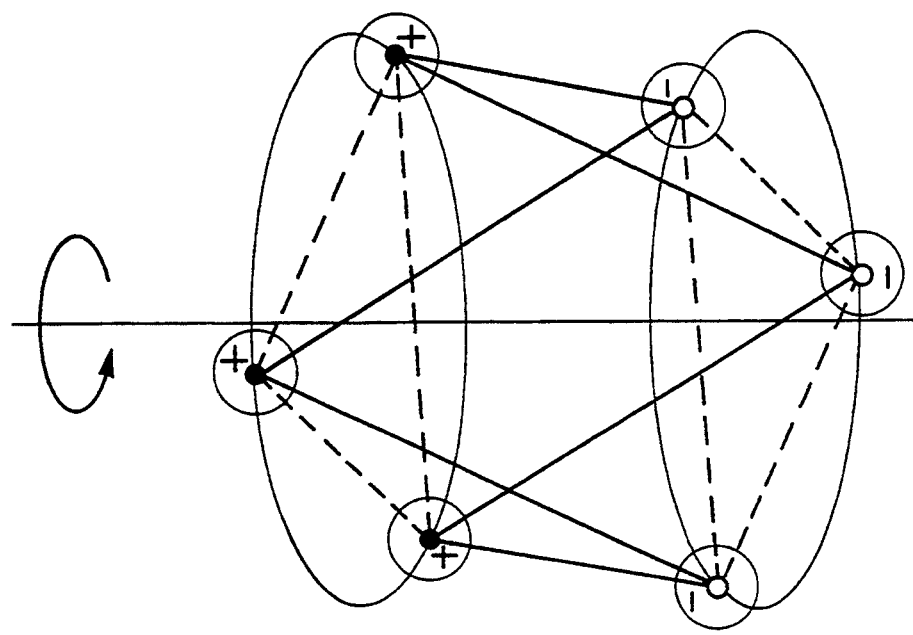
FIG. 3 is a diagrammatic view of an octahedron of particles.
Figure 2:
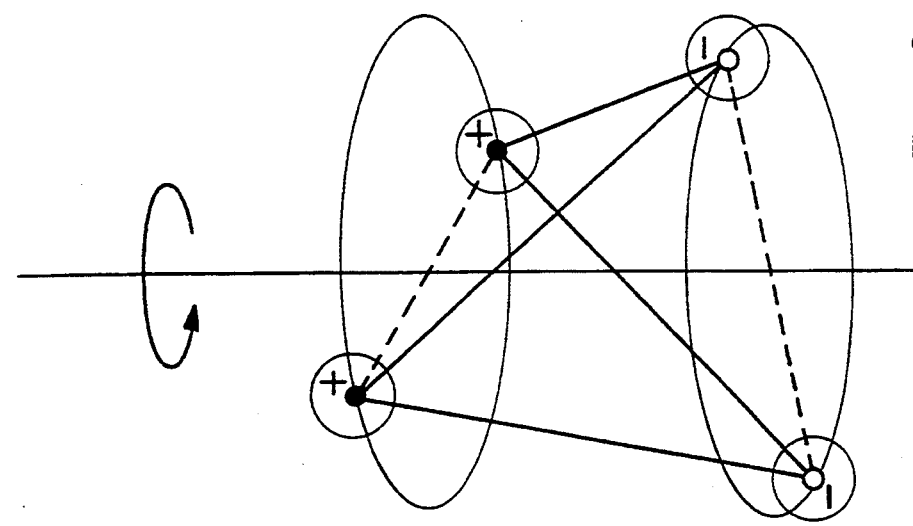
FIG. 2 is a diagrammatic view of a tetrahedron of particles.
Figure 4:
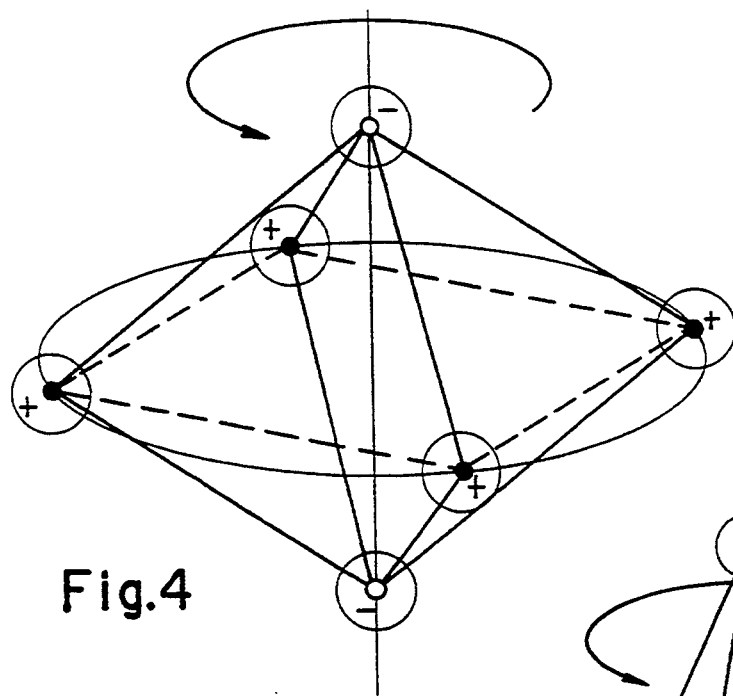
FIG. 4 is a diagrammatic view of an octahedron of particles.
Figure 5:
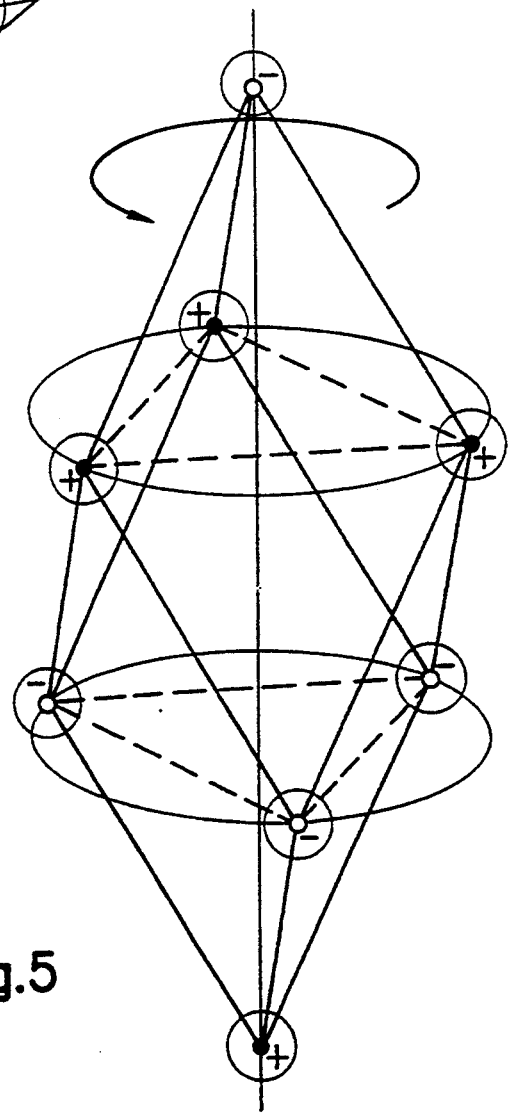
FIG. 5 is a diagrammatic view of a rhombohedron of particles.
Figure 6:
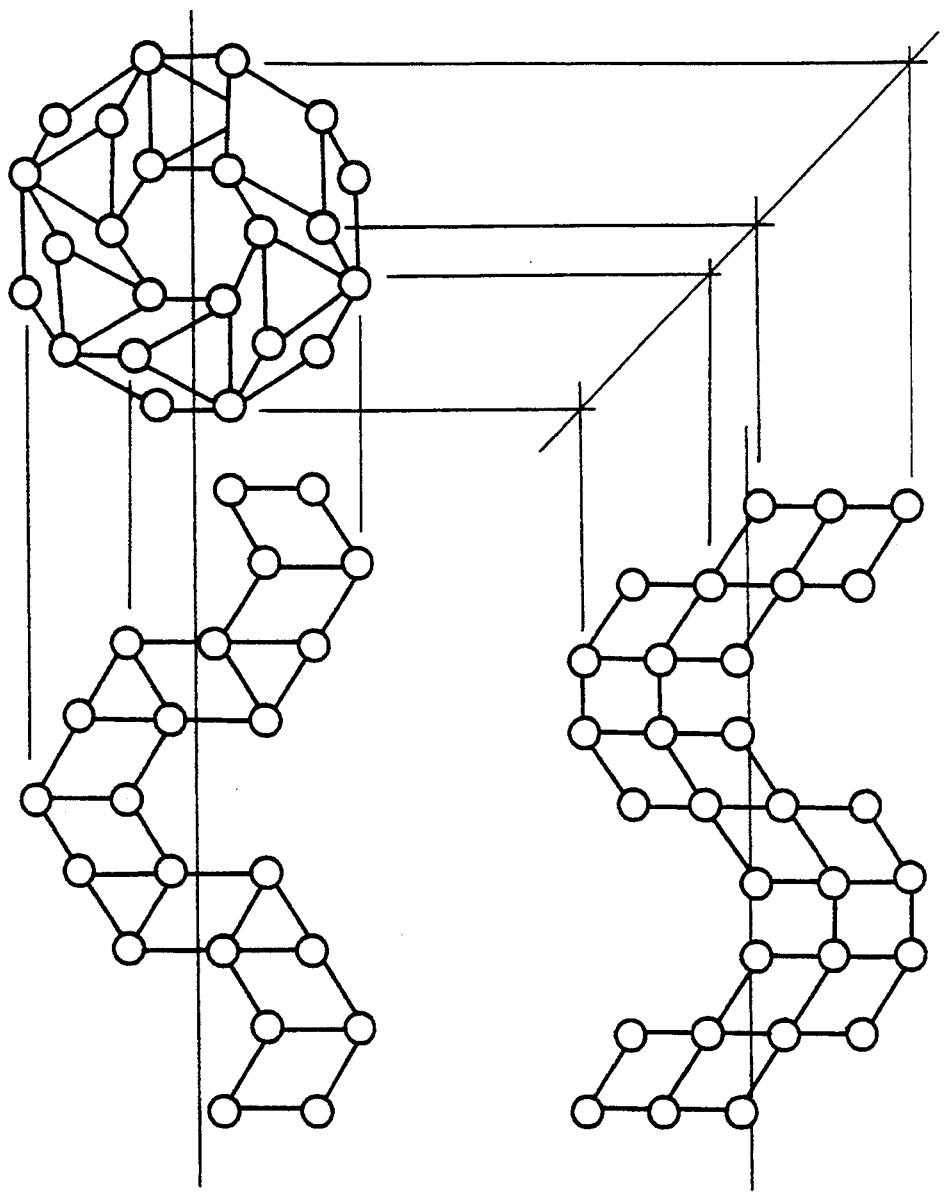
FIG. 6 is a diagrammatic view of a spiral of particles.
Figure 7:
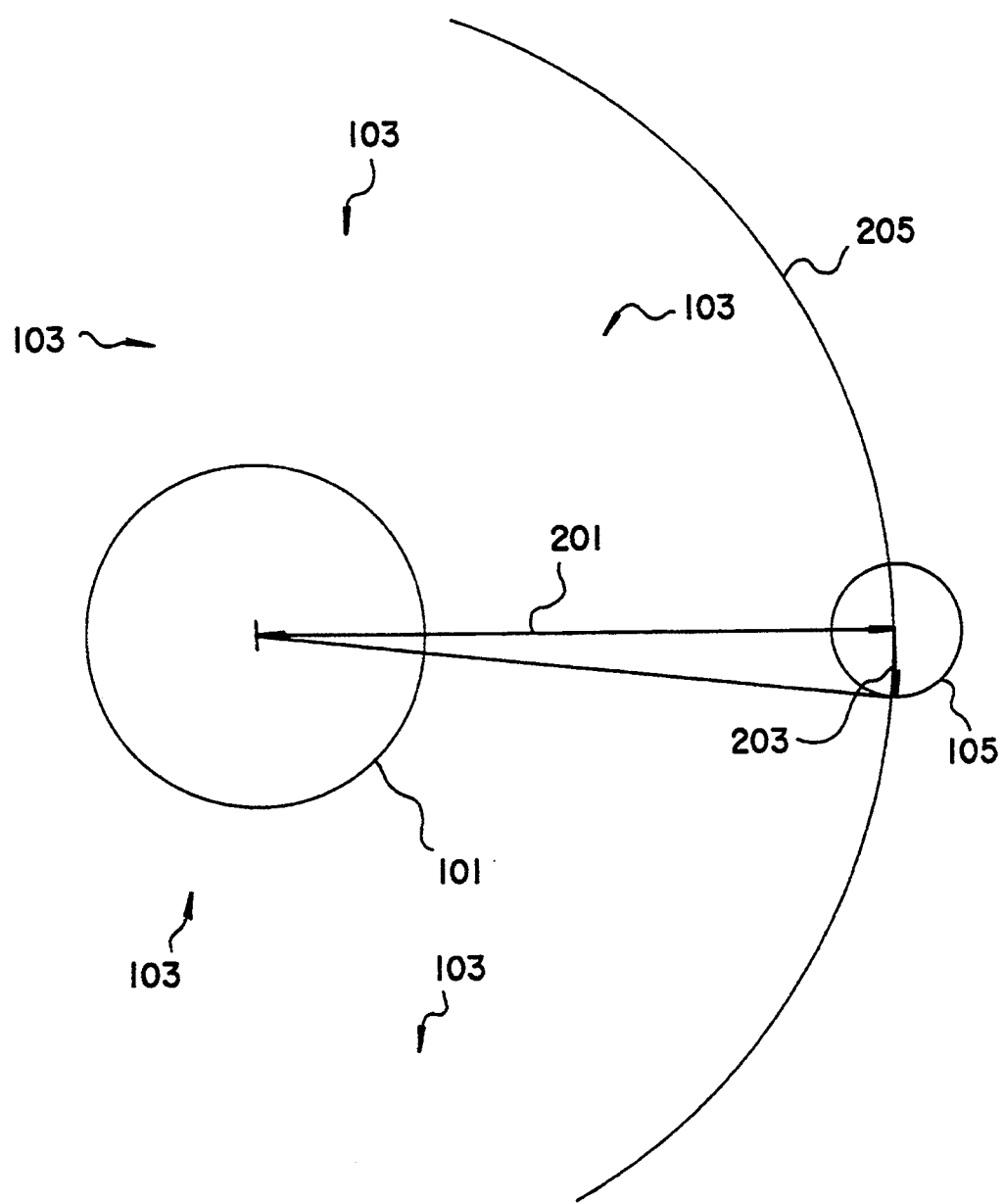
FIG. 7 is a diagrammatic view of the Earth with an Earth Satellite in orbit.
Figure 8:
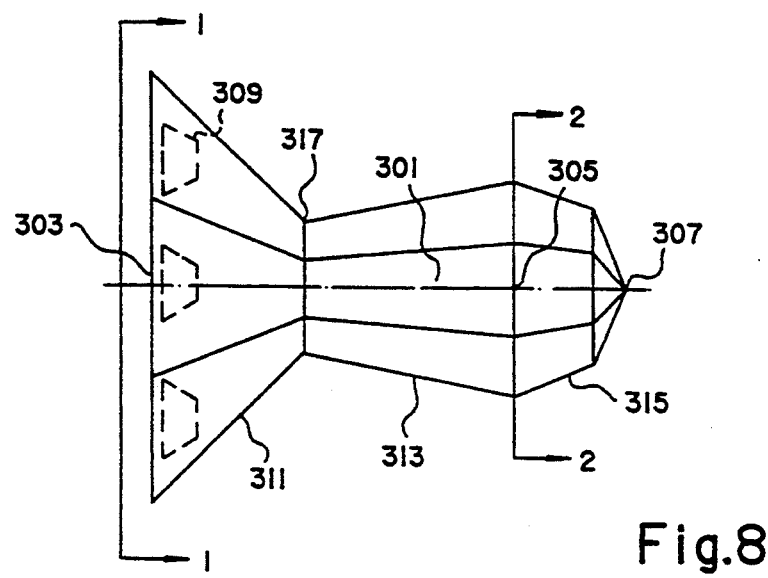
FIG. 8 is a diagrammatic side view of an OCTM GG&P System Communications Satellite.
Figure 9:
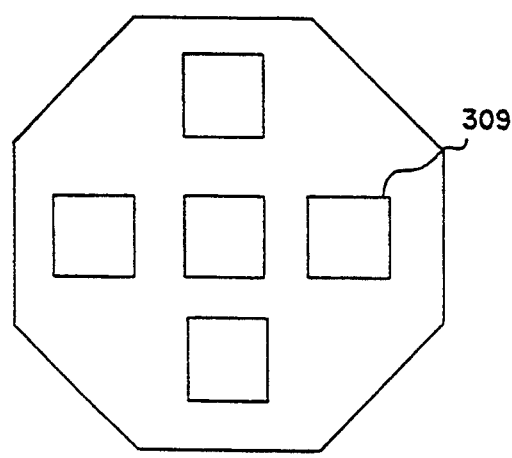
FIG. 9 is a diagrammatic antennae end view A—A of the OCTM GG&P System Communications Satellite in FIG. 8.
Figure 10:
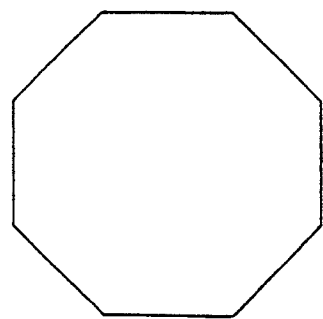
FIG. 10 is a diagrammatic cross-section view M—M of the OCTM GG&P System Communications Satellite in FIG. 8.

Level I Method Rules to change a Spin Stabilized Geosynchronous Communications Satellite to a Fully Stabilized Geosynchronous Communications Satellite of the same mass are as follows:

Rule (A)—The center line axis of the Satellite 301, FIG. 8, is located so the antennae end 303, points toward the center of the Earth when the satellite is in proper geosynchronous orbit.

Rule (B)—The center of mass of the satellite 305 is located on the center line axis and toward the end of the center line axis that points away from the center of the Earth. This is the most massive end 307, of the satellite.

Rule (C)—The pencil beam microwave antennae 309, are located to point toward the center of the Earth when the antennae end of the center line axis points toward the center of the Earth.

Rule (D)—The mass of the satellite is balanced about the center line axis. The mass of the antennae end 303, of the satellite will automatically attempt to move into the "matter shadow" of the "hard mass centers" of the more massive end 307, in a balanced manner about center line axis. The outside surfaces can be flat or curved. Flat surfaces enable present Solar Cells to be used initially.

Rule (E)—The "hard mass center" area cross-section silhouette of the satellite with the center line axis pointing to the center of the Earth is made so that it has the same "hard mass center" area cross-section silhouette as the spin stabilized satellite of the same mass in proper orbit when viewed from the center of the Earth.

The most critical element essential to proper design of a fully stabilized satellite according to the Level I Method Rules is to change the location and configuration of the existing mass of the spin stabilized communications satellite so that the center of mass is properly located.

Figure 11:
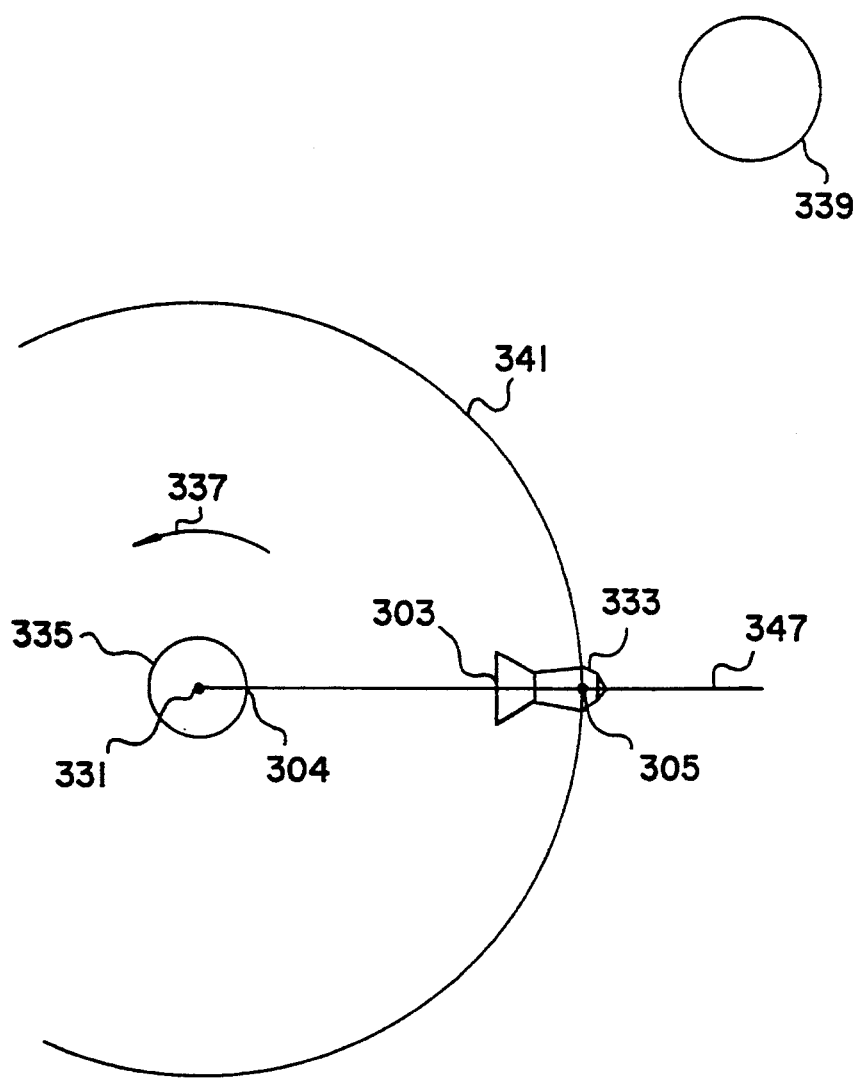
FIG. 11 is a diagrammatic view of a OCTM GG&P System Communications Satellite in orbit about the Earth on Station.

In operation, the satellite 333, FIG. 11, is put in proper geosynchronous orbit 341, using the present proven geosynchronous orbit insertion techniques. The north pole 331 of the Earth is located at the center of the Earth "matter shadow" 335, as illustrated. The arrow 337, indicates the direction of rotation of the Earth and of the satellite about the Earth. The Sun 339 is also illustrated. The dot 304, represents the spot on the Earth's surface at the equator where the satellite is on station when directly overhead. The on station line 347, passes through the center of the Earth and the on station dot 304.

After the satellite is in proper orbit, it is put in the initial starting position with the antennae end of the center line axis pointing toward the center of the Earth through the on station dot. The satellite can be placed in a very slow spin about the center line axis using present techniques, so the satellite is uniformly heated by the Sun as presently practiced.

When the satellite is in a very slow spin about the center line axis, and the antennae end is pointing to the center of the Earth, FIG. 11, the total kinetic energy from incoming spirals of high speed electromagnetic spectrum particles is effectively balanced in all directions except for the net kinetic energy due to the gravitation "matter shadows" between the Earth and the Geosynchronous Satellite. In this position, the GG&P Fully Stabilized satellite is absorbing the same net kinetic energy from particles of matter from space and is being accelerated toward the center of the Earth exactly as the Spin Stabilized satellite of the same "hard mass center area silhouette" and the same mass. (Both the mass and the "hard mass center area" silhouette are the same by definition in this case.) Therefore the orbits 341 of both satellites will be the same.

Figure 12:
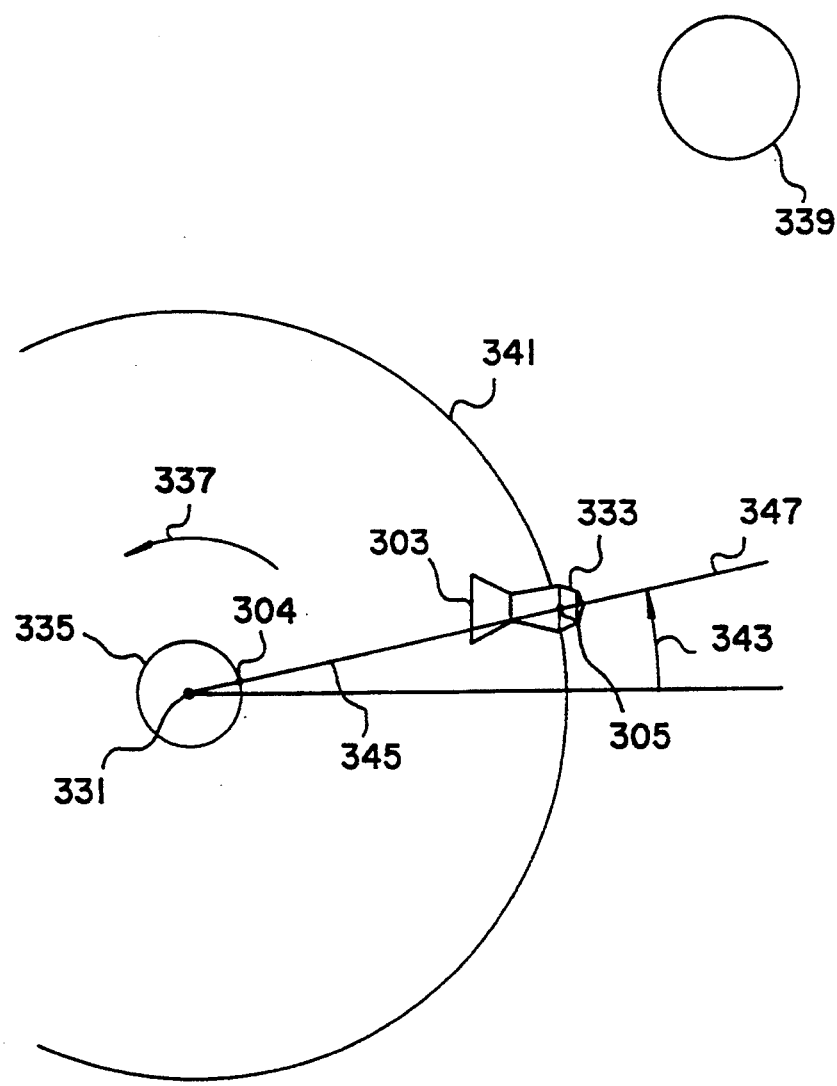
FIG. 12 is a diagrammatic view of a OCTM GG&P System Communications Satellite in orbit about the Earth ahead of Station with the antennae end not pointing toward the center of the Earth.

The very slow spin about the center line spin axis now automatically causes the antennae end of the satellite 303, FIG. 12, to continue to point almost to the center of the Earth. The reasons why are as follows:

The satellite is moving in the same angular direction of rotation as the surface of the Earth as indicated by arrow 337, FIG. 12. In FIG. 12, the satellite and the Earth have moved anti-clockwise a few degrees as indicated by the angle 343. The on station line 347, has moved about the north pole of the Earth 331 as indicated by the on station dot 304.

Newton's law of momentum wants to retain the center line axis in the same attitude as in FIG. 11, as shown in FIG. 12.

In FIG. 12, the net kinetic energy balance from the mutual gravitation "matter shadows" has stayed about the same as it was in FIG. 11, but it has been shifted slightly in a very meaningful way in relation to the antennae end 303 and the center of mass of the satellite 305, FIG. 12.

Drawing a line 345, from the center of the Earth 331, to the center of Mass 305 of the satellite 333. This line 345 is the PUSH of gravity net kinetic energy balance line. In this particular case the PUSH of gravity net kinetic energy balance line is a segment of the on station line 347 as the satellite is on station in FIG. 12. As long as the amount of net kinetic energy is the same on both sides of this net kinetic energy balance line, the PUSH of Gravity net kinetic energy forces acting on the satellite are in balance and are only accelerating the satellite toward the center of the Earth in Geosynchronous Orbit.

When the opposite sides of the antennae end are not in balance about this net balance line, as illustrated in FIG. 12, then a small portion of the net kinetic energy is hitting the leading "hard mass center area" of the antennae end in just the right way to drive the leading "hard mass center area" of the antennae end back into the "matter shadow" of the massive end of the satellite, causing the satellite to rotate about it's center of mass 305.

As soon as the leading "hard mass center area" of the antennae end is in balance with the trailing "hard mass center area" of the antennae end about the net kinetic energy balance line, the antennae end is pointing almost to the center of the Earth, as is should be. This automatic PUSH of Gravity net kinetic energy balancing act is going on literally millions of times a second, just like it does on the Moon. Notice the antennae end is also automatically trimmed in the plane of the orbit of the satellite in exactly the same way at the same time.

All pencil beam microwave antennae of satellite 333 are now automatically pointed almost toward the center of the Earth all of the time, exactly as required for the GG&P Fully Stabilized Geosynchronous Communications Satellite using Level I Method Rules of the GG&P invention. The present systems of station keeping are used to keep the satellite on station by definition under Level I Method Rules.

The redesign of the center of mass to conform with the teachings of the present invention, through repackaging present satellite equipment to conform to Level I Method Rules of the GG&P invention for Fully Stabilized Geosynchronous Communications Satellites, will increase the capacity of present Spin Stabilized Geosynchronous Communications Satellites by about twenty five times with the same lift-off weight and using fixed "hard mass center area" "matter shadows".

Level II Method Rules change a Spin Stabilized Geosynchronous Communications Satellite to a GG&P Fully Stabilized Geosynchronous Communications Satellite with the station keeping function transferred to the GG&P invention as follows:

Level II Method Rules start with Rule (A), Rule (B), Rule (C) and Rule (D) which are exactly the same as Level I Method Rules (A), (B), (C) and (D).

Rule (E)—Level I Method Rule (E) is modified by adding the ability to increase or decrease the "hard mass center area" silhouette of the mass in the antennae end, when viewed from the center of the Earth when the satellite is in proper orbit. A neutral "hard mass center area" silhouette of the antennae end is determined by making the neutral "hard mass center area" silhouette the same as the "hard mass center area" silhouette of the spin stabilized satellite in the same manner as for Rule (E) in Level I Method Rules.

The antennae end is designed in such a manner that the "hard center mass area" silhouette of the antennae can be increased or decreased from the neutral "hard center mass area" silhouette in a symmetrical manner. The antennae end is made so the Mass can fan out in a balanced manner. This causes slightly more "hard mass centers" to be hit by incoming particles of matter from space. This increases the net kinetic energy being absorbed by the total satellite from incoming particles of matter from space. This causes the satellite to be driven into a slightly lower Earth orbit.

The "hard mass center area" silhouette of the antennae end is decreased by folding up the antennae end mass behind the mass of the massive end of the satellite like folding up an umbrella. This causes the more massive end to partially shield the antennae end mass from the full flux of income particles of matter from space. This causes slightly fewer "hard mass center areas" to be hit by incoming particles of matter from space. This decreases the net kinetic energy being absorbed from incoming particles of matter from space. This allows the satellite to move into a slightly higher Earth orbit.

This increase or decrease in the "hard mass center area" of the Antennae end is controlled by the station keeping guidance system. Station keeping with the Level II Method GG&P invention works as follows:

After the satellite is in geosynchronous orbit, there is a slight drifting of the satellite in relation to the ground over long periods of time due to the slightly varying net kinetic energy from the mutual gravitation "matter shadows" of the Earth, Moon and Sun. This presently is adjusted by using rockets to change the speed of the satellite very slightly.

Figure 13:
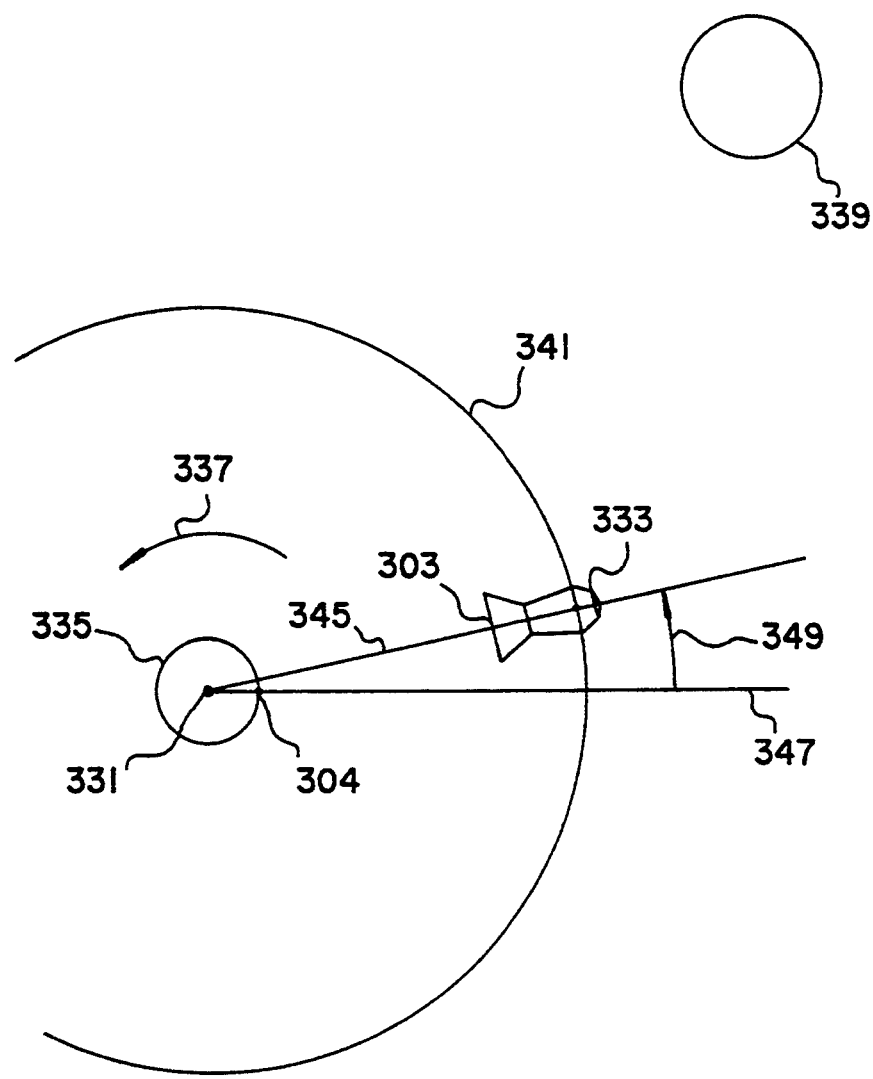
FIG. 13 is a diagrammatic view of a OCTM GG&P System Communications Satellite in orbit about the Earth ahead of Station with the antennae end pointing toward the center of the Earth.

The Level II Method GG&P invention increases or decreases the effective "hard mass center area" of the antennae end to change net kinetic energy being absorbed from the particles of matter coming in from space to change the altitude of the satellite. The station keeping guidance system uses it's ability to increase or decrease the effective "hard mass center area" to change the altitude of the satellite in the following manner:

In FIG. 13, we show the satellite in orbit and in proper balance about the OCTM net kinetic energy balance line 345 but not on the proper station line 347 as indicated by the center of the Earth and the on station dot 304. The satellite 333, is ahead of proper station by an angle indicated by 349.

Present techniques use rocket power to change the speed of the satellite and thus bring the satellite back on station. Rocket power is not only limited but using rocket power changes the mass of the satellite and this in turn changes the orbit of the satellite slightly.

When the satellite is ahead of station, with the Level II Method GG&P invention, the speed of and mass of the satellite are not changed. The altitude of the satellite is changed slightly by decreasing the effective "hard mass center area" of the antennae end. This in turn slightly reduces the net kinetic energy being absorbed from the particles of matter from space.

This reduces the acceleration of the satellite towards the center of the Earth slightly and allows the GG&P net kinetic energy balancing altitude of the satellite to increase. When the altitude of the orbit increases slightly and the speed of the satellite stays the same, the angular velocity of the satellite about the Earth is reduced slightly and the satellite drops back to it's proper on station 347.

Figure 14:
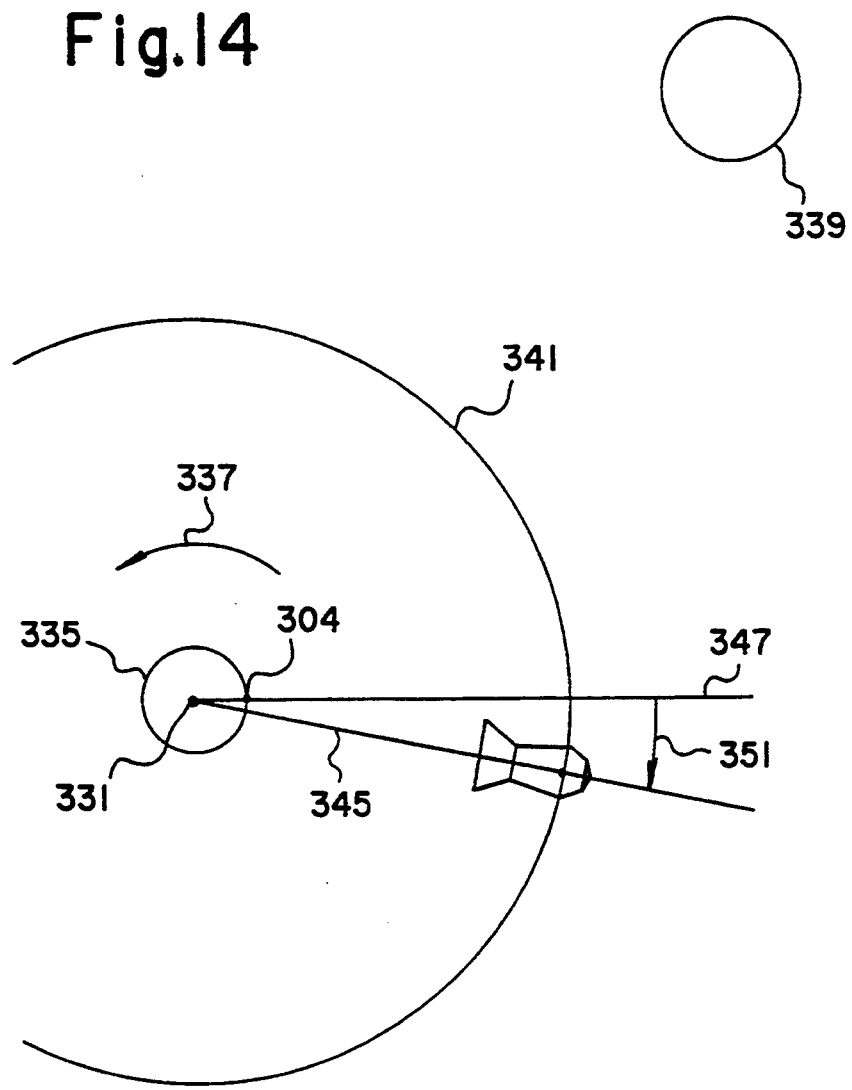
FIG. 14 is a diagrammatic view of a OCTM GG&P System Communications Satellite in orbit about the Earth behind Station with the antennae end pointing toward the center of the Earth.
Figure 15:
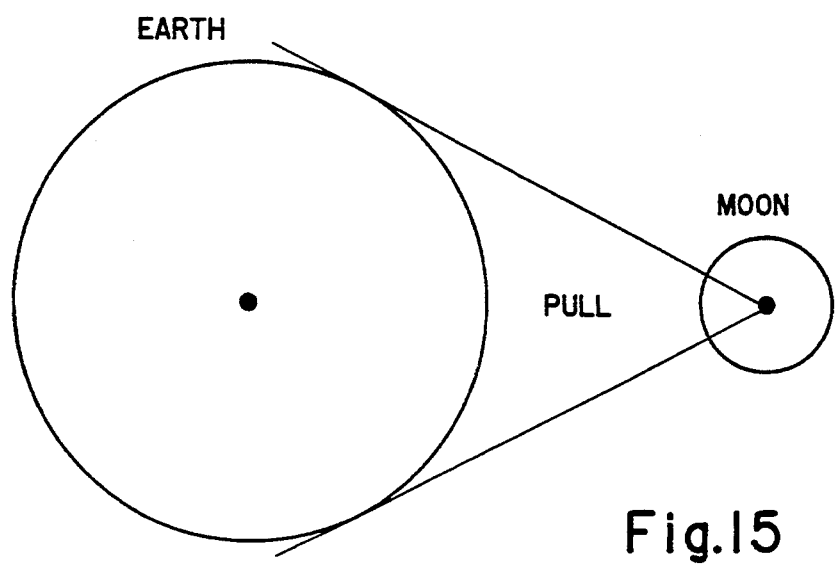
FIG. 15 is a diagrammatic view of the traditional PULL of Gravity Theory of the Earth's Mass effectively PULLING on the center of the Moon's Mass.
Figure 16:
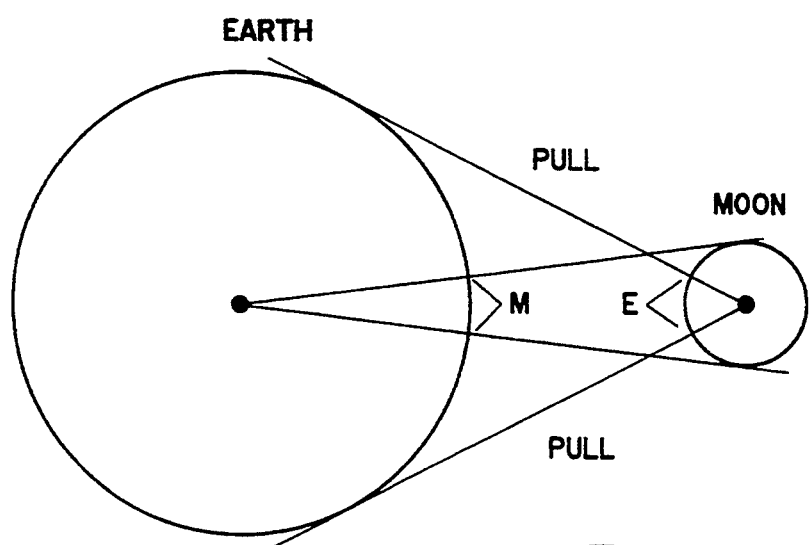
FIG. 16 is a diagrammatic view of the traditional PULL of Gravity Theory of the Earth's Mass effectively PULLING on the center of the Moon's Mass and the Moon's Mass effectively PULLING on the center of the Earth's Mass.
Figure 17:
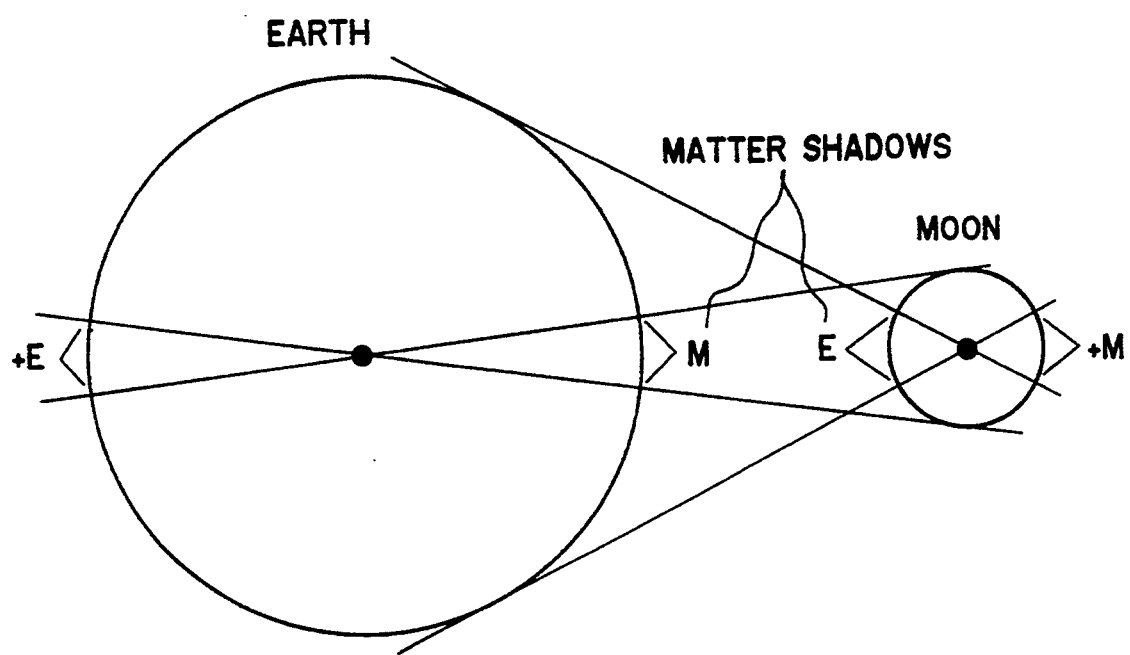
FIG. 17 is a diagrammatic view of the Net Balance of kinetic energy PUSH of Gravity Theory, where the Earth's Mass is being PUSHED toward the center of the Moon and the Moon's Mass is being PUSHED toward the center of the Earth.

As long as this increased altitude is maintained the satellite continues to drop back and will eventually be as indicated in FIG. 14 where the satellite is behind it's proper on station 347.

In the case shown in FIG. 14, the station keeping guidance system will call for more angular velocity of the satellite about the Earth. This is obtained in a reverse manner. Again the speed of the satellite is not changed. The station keeping guidance system increases the net effective "hard mass center area" of the silhouette of the antennae end very slightly. This slightly increases the net kinetic energy being absorbed by the satellite. This accelerates the satellite a little more toward the center of the Earth as the mass of the satellite has stayed the same.

This reduces the altitude of the satellite slightly. Reducing the altitude slightly without changing the velocity of the satellite, increases the angular velocity of the satellite slightly about the center of the Earth thus bringing the satellite back on station.

The station keeping guidance system reduces this hunting action to almost the actual slight changes in the net kinetic energy of the Sun, Planets and Moons acting on the satellite.

As time passes, the normal 22,300 mile geosynchronous orbit will tend to fill up. The Level III Method GG&P invention provides a very simple solution to this problem.

The Level II Method GG&P invention automatically gives the satellite the ability to be in a geosynchronous orbit at slightly higher and lower altitudes as well as at 22,300 miles without any change. As long as the limit of the station keeping guidance system is not exceeded, satellites with Level II Method GG&P invention systems can be placed in slightly higher or lower GG&P geosynchronous orbits different than the 22,300 mile geosynchronous orbit.

All that is required is the initial speed of the satellite must match the geosynchronous orbit desired. Present techniques are used to do this at the time the satellite is initially put into geosynchronous orbit.

When it is desired to have a GG&P Geosynchronous Satellite at an altitude that is out of range allowed by the Level II Method GG&P invention, you go to Level III Method Rules and design a GG&P Geosynchronous Orbit Altitude that is substantially different than the normal 22,300 mile orbit as follows:

Level III Method Rules start with Rule (A), Rule (B), Rule (C), and Rule (D) which are exactly the same as Level I Method and Level II Method Rules (A), (B), (C) and (D).

Rule (E)—Level II Method Rule (E) is modified by changing the method to determine the neutral net effective "hard mass center area" silhouette of the antennae end of the satellite. After the proper neutral net effective "hard mass center area" silhouette of the antennae end is determined, all other Rules of Level II Method apply.

The desired GG&P geosynchronous altitude is determined. The mass of the satellite is determined. After these two facts are known, the force of acceleration necessary to maintain the satellite in GG&P geosynchronous orbit can be calculated. The neutral net effective "hard mass center area" of the satellite is designed to give this exact acceleration from the absorbed net kinetic energy of particles of matter from space.

Readings and measurements from a Level II Method GG&P system will enable very close estimates of the proper neutral net effective "hard mass center area" of the satellite when the desired mass of the satellite is known.

When the neutral net effective "hard mass center area" of the satellite allows a net kinetic energy balance at the desired altitude with the desired mass, the station keeping guidance system is operating in the middle of it's range of altitudes.

Present geosynchronous orbit techniques only need to change their injection speed and injection altitude to match the desired GG&P altitude. From that point on, the Level III Method GG&P invention for Fully Stabilized Geosynchronous Communications Satellites operates exactly as the Level II Method GG&P system does for normal 22,300 mile Geosynchronous altitudes. Other improvements, modifications and embodiments will become apparent to one of ordinary skill in the art upon review of this disclosure. Such improvement, modifications and embodiments are considered to be within the scope of this inventions defined by the following claims. For example, it is, of course, contemplated other satellites and space vehicles will be able to implement the invention helping orient, guide and propel such satellites in desired manners.

I claim:

1. A fully self-stabilized satellite for geosynchronous Earth orbit within the gravitational influence of the earth, comprising:
    a first antennae end designed for facing toward an Earth station;
    a second massive end designed for facing away from the Earth;
    a centerline extending from said antennae end to said massive end and designed to line along an on-station line when said satellite is in proper orientation, wherein the center of the Earth and said station lie along said on-station line; and
    self-stabilizing means for establishing satellite orientation by interaction with said gravitational influence of the earth, including positioning; the center of mass of said satellite is closer to said massive end of said satellite thereby affecting said gravitational influence to constantly maintain said antennae end oriented toward said earth station without adjustment of said satellite.

2. A method of orienting a satellite in Earth orbit under the influence of the net kinetic energy of electromagnetic spectrum particles by arranging the center of mass of said satellite which casts a matter shadow by blocking said particles closer to one end of a line drawn through said center of mass, where an antennae located at the longer end of said line essentially points to the center of the Earth thereby causing said antennae to be positioned in said matter shadow of said center of mass and to maintain said orientation through the influence of said particles.

3. A method of orienting a satellite in Earth orbit according to claim 2, wherein
    additional means are provided to change the mass cross-section of said satellite when viewed from the center of the Earth.

* * * * *